(No Model.)
J. S. SCOTT.
Straw Carrier Attachment for Separating Grain from Straw.
No. 238,719.  Patented March 8, 1881.
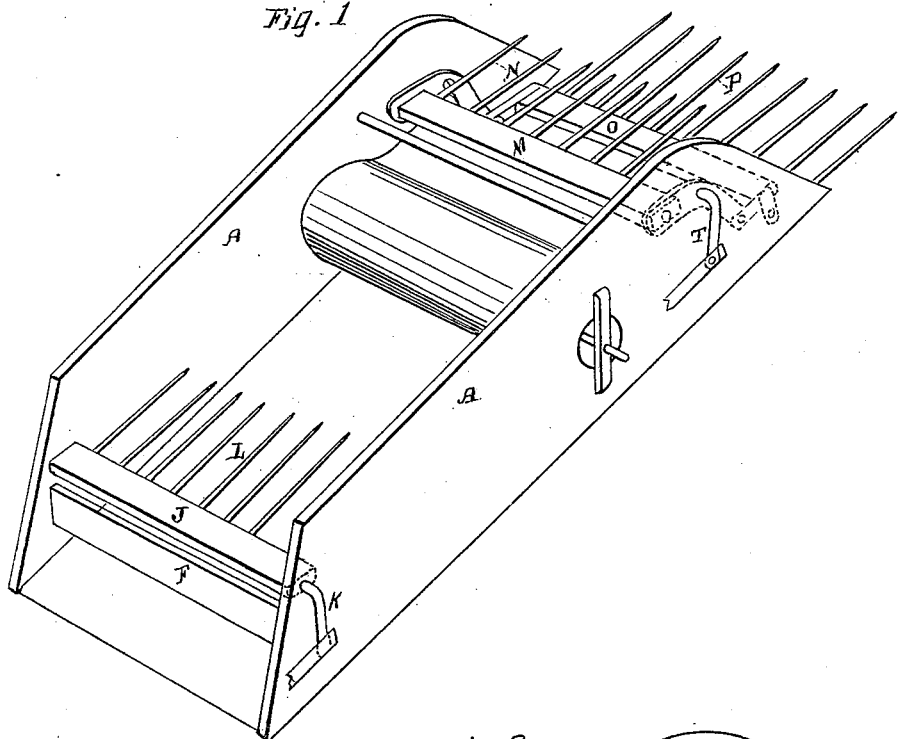
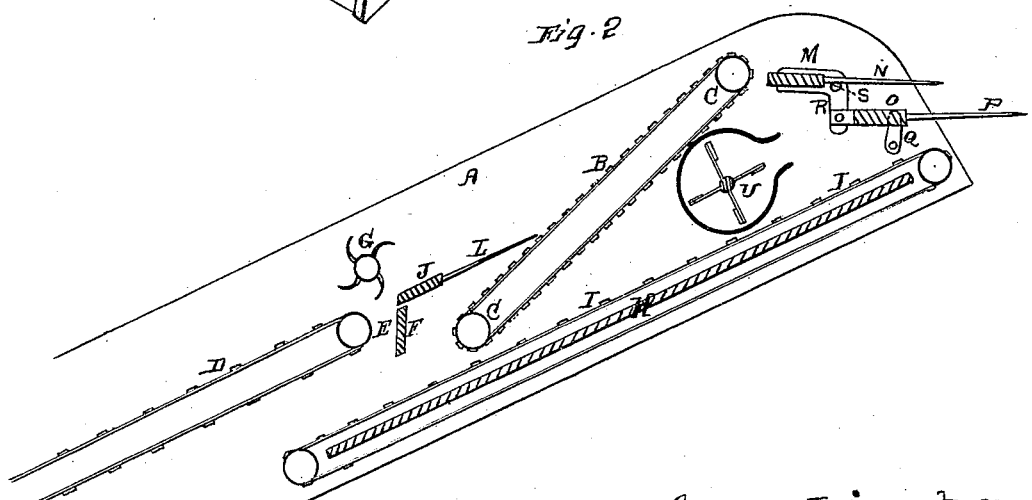

UNITED STATES PATENT OFFICE.

JASPER S. SCOTT, OF SAN JOSÉ, CALIFORNIA.

STRAW-CARRIER ATTACHMENT FOR SEPARATING GRAIN FROM STRAW.

SPECIFICATION forming part of Letters Patent No. 238,719, dated March 8, 1881.

Application filed December 2, 1880. (No model.)

*To all whom it may concern:*

Be it known that I, JASPER S. SCOTT, of San José, county of Santa Clara, State of California, have invented an Improved Straw-Carrier Attachment for Separating Grain from Straw; and I hereby declare the following to be a full, clear, and exact description thereof.

My invention relates to certain improvements in devices for separating grain from the straw with which it is mixed and entangled after it leaves the thrashing-cylinder and passes up the grain-belt to the straw-carrier; and it consists of a series of vibrating bars having lifting-fingers. These bars are set one just at the lower end of the straw-carrier and the other two beyond its outer end, and they are all caused to oscillate by means of crank-arms, so as to separate the remaining grain from the straw before it passes over the tail-board and is discharged.

In combination with this device I may use a small supplemental fan-blower by which the work is assisted.

Referring to the accompanying drawings for a more complete explanation of my invention, Figure 1 is a perspective view of my device. Fig. 2 is a longitudinal section, showing its connection with the thrashing-machine.

A A are the sides of the trough or spout, within which the straw-carrier moves.

B is the straw-carrier belt, which moves around the drums or rollers C at each end, and it is so placed that it receives the straw from the grain-belt D and carries it forward and upward to the discharge. The grain and straw as they leave the thrashing-cylinder are received upon the grain-belt D, and are by it carried upward, and the grain falls through the space E between the end of the belt and the bluff-board F, passing thence down to the separating and cleansing shoe below.

A picker, G, of any suitable form, is placed so as to revolve just above the end of the grain-belt, to separate and loosen the straw and assist it forward onto the straw-carrier in the usual manner.

The straw-carrier B is an open-slat belt, through which any grain which may have been carried beyond the proper point of separation, E, may fall upon the return-board H, and be carried back by the drag I, which is an open-slat belt moving backward and downward over the board, as shown. These parts are common to thrashing-machines or separators, and are here shown to explain the relation of my improvements, which consist of the vibrating bars with their fingers or arms. The first of these bars, J, extends across the spout just in front of and above the bluff-board F, and is caused to oscillate or vibrate by a crank-arm, K, outside, having a suitable connecting-rod or other driving device. The bar J has long fingers L projecting forward from it, and the bar is made broad enough to receive the straw as it comes from the picker and give it direction, thus preventing it from falling through endwise between the fingers. The straw passes over these fingers and falls upon the carrier B, the fingers tossing and separating it by a gentle movement, which allows the grain to become detached and fall through to the return-board. From this point the straw is moved up by the carrier and discharged over its upper end, falling upon the broad oscillating bar M, which is constructed like the bar J and has similar fingers N. From this the straw falls upon the final bar, O, and passes off over the fingers P and is discharged.

The forward end of the bar O is supported by the links Q, pivoted or journaled below, so that the bar and fingers may have a sort of rocking motion about this point. Bell-crank levers R, at each end, connect the bars M and O with each other, so that the shaft S, to which these levers are secured, may give motion to both. A crank-arm, T, outside the machine, and secured to the shaft S where the latter projects through the side, serves to move the two bars M and O. The movement of the bar M with its fingers is a rocking or vibratory motion about the shaft S as a center, while that of the bar O is slightly vibratory, and at the same time a forward and back motion about the journals of the arm Q. The forward movement of the bar O takes place while the arms N perform their upward movement, and the backward motion of the bar O occurs with the downward movement of the fingers N, this being effected by means of the bell-crank levers R. This action serves to free the straw from the remaining grain, which falls upon the return-board H, and is carried down by the drag to the cleaning-shoe with the remainder of the grain. The vibration of the bars may be from seventy-five to one hundred or more per minute. I have found the latter rate of speed to be very effective. In order to assist this final separation of the straw from the grain, I employ a supplemental fan or blower, U, which may be placed just beneath the front end of the straw-carrier, above the return-board, and its discharge is forward and through or between the fingers of the bars M O. This device is found very useful where the straw is heavy.

Having thus described my invention, what I claim as new, and desire to secure by Letters Patent, is—

1. The flat vibrating bar J, made broad, as shown, and provided with the fingers L, said bar being placed in rear of the grain-belt and above the straw-carrier, and oscillated by a crank-arm, K, or equivalent device, substantially as and for the purpose herein described.

2. The flat vibrating bars M and O, with their fingers N and P, placed behind and below the rear end of the straw-carrier B, and united by the bell-crank levers R, so as to operate substantially as and for the purpose herein described.

3. The flat bar O, with its fingers P, supported by the links Q, and connected with the similar bar M by the bell-crank levers R, and operated by the crank or rocker shaft S, whereby the bar M has a vibrating movement, while the bar O has a forward and back movement, in combination with the straw-carrier B, substantially as herein described.

4. The flat vibrating bars M and O, with their fingers N and P, mounted behind and below the straw-carrier B, and operated by the rock-shaft S and bell-crank levers R, as shown, in combination with the fan or blower U, discharging through the fingers, substantially as and for the purpose herein described.

In witness whereof I have hereunto set my hand.

JASPER S. SCOTT.

Witnesses:
 FREDERICK SMITH,
 WILLIAM HINDLE.